O. KAUFMAN.
MANTLE SHAPING MACHINE FOR UPRIGHT MANTLES.
APPLICATION FILED APR. 12, 1912.

1,069,262.

Patented Aug. 5, 1913.

6 SHEETS—SHEET 1.

Witnesses
H. H. Lybrand
R. L. Straus

Inventor
Otto Kaufman
By
Joseph L. Levy
Attorney

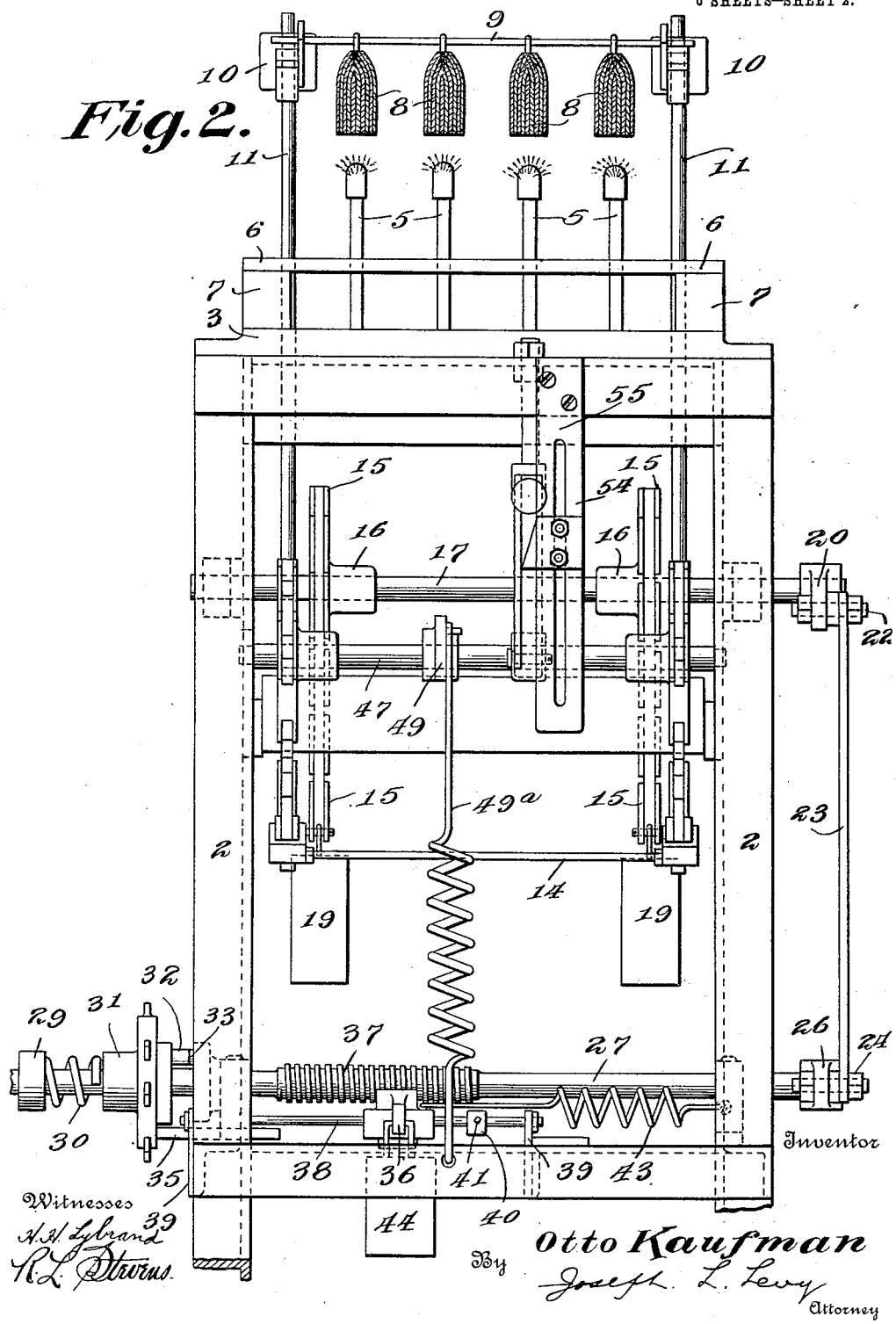

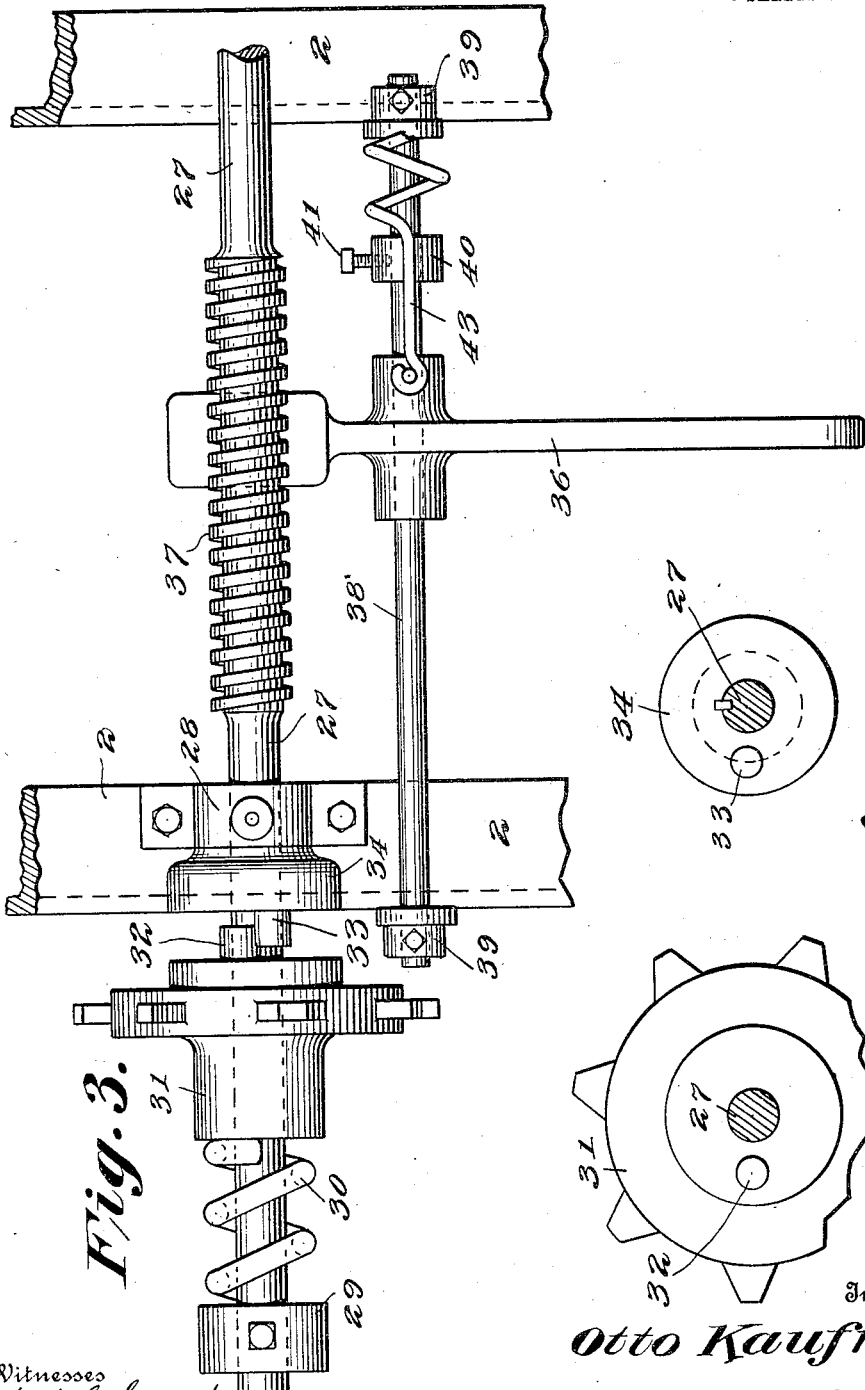

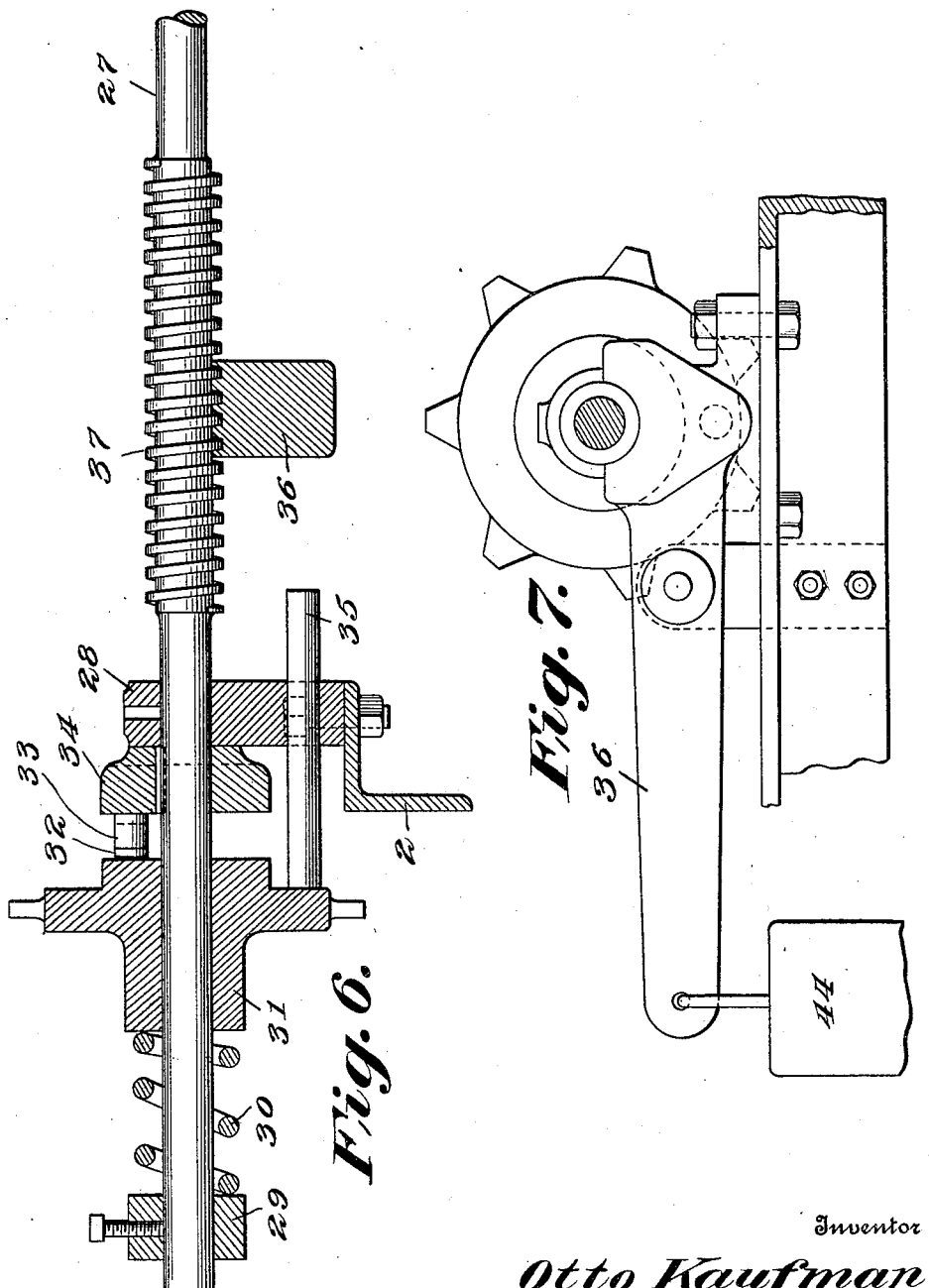

O. KAUFMAN.
MANTLE SHAPING MACHINE FOR UPRIGHT MANTLES.
APPLICATION FILED APR. 12, 1912.

1,069,262.

Patented Aug. 5, 1913.
6 SHEETS—SHEET 5.

Witnesses
H. H. Lybrand
R. L. Petrus

Inventor
Otto Kaufman
By Joseph L. Levy
Attorney

COLUMBIA PLANOGRAPH CO., WASHINGTON, D. C.

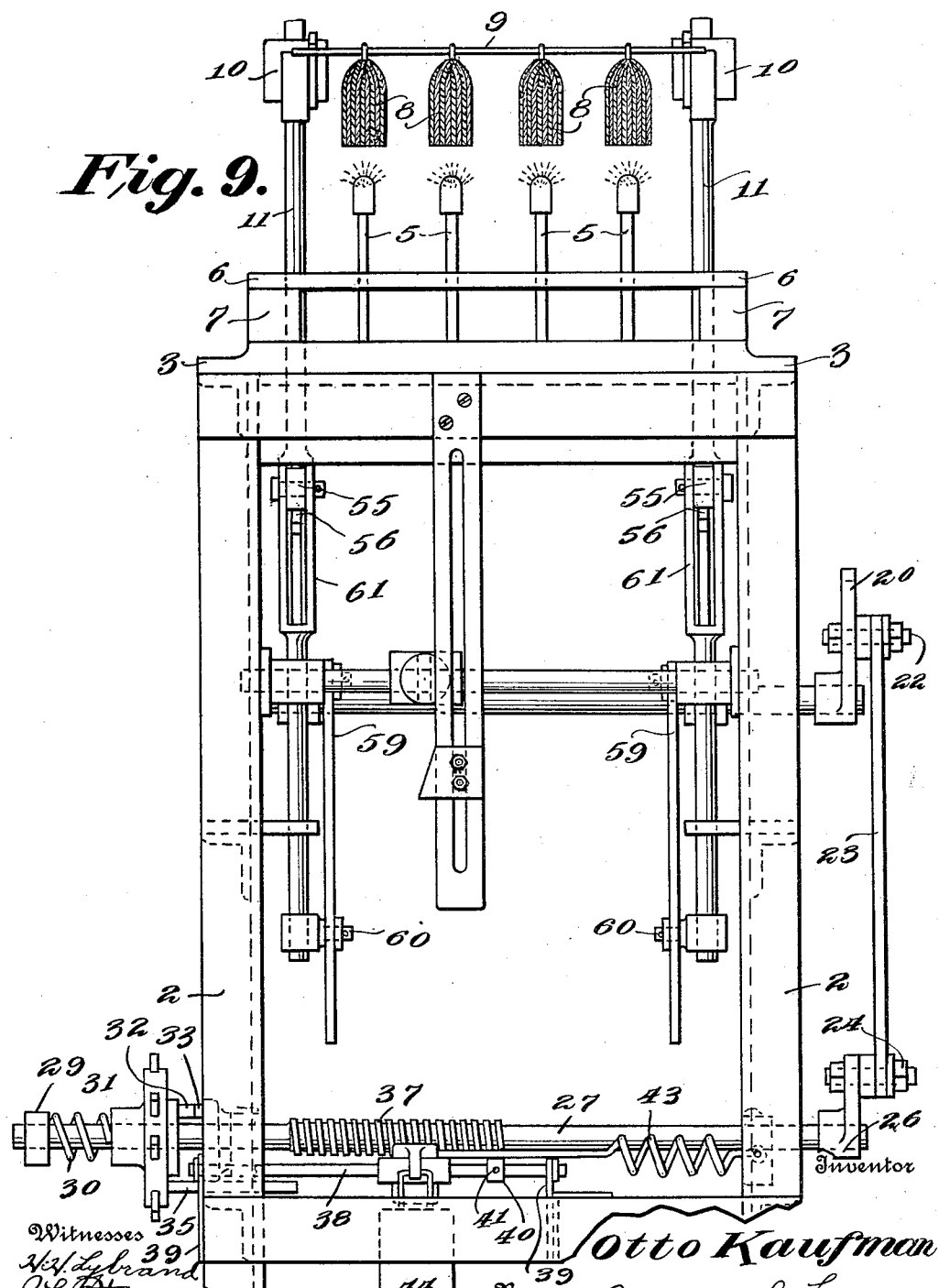

UNITED STATES PATENT OFFICE.

OTTO KAUFMAN, OF YOUNGSTOWN, OHIO.

MANTLE-SHAPING MACHINE FOR UPRIGHT MANTLES.

1,069,262. Specification of Letters Patent. Patented Aug. 5, 1913.

Application filed April 12, 1912. Serial No. 690,392.

*To all whom it may concern:*

Be it known that I, OTTO KAUFMAN, a citizen of the United States, residing at the city of Youngstown, county of Mahoning, and State of Ohio, (whose post-office address is care of the Block Light Co., in said city,) have invented a certain new and useful Improvement in Mantle-Shaping Machines for Upright Mantles, of which the following is a specification.

The object of my invention is to provide a machine of this class, which is accurate and reliable in its operation and which will properly shape and burn the mantles upon which it acts, so that when they leave the machine they will be in a proper condition for further treatment. This object is accomplished by my invention, some embodiments of which are hereinafter set forth.

For a more particular description of my invention, reference is to be had to the accompanying drawings, in which—

Figure 1:
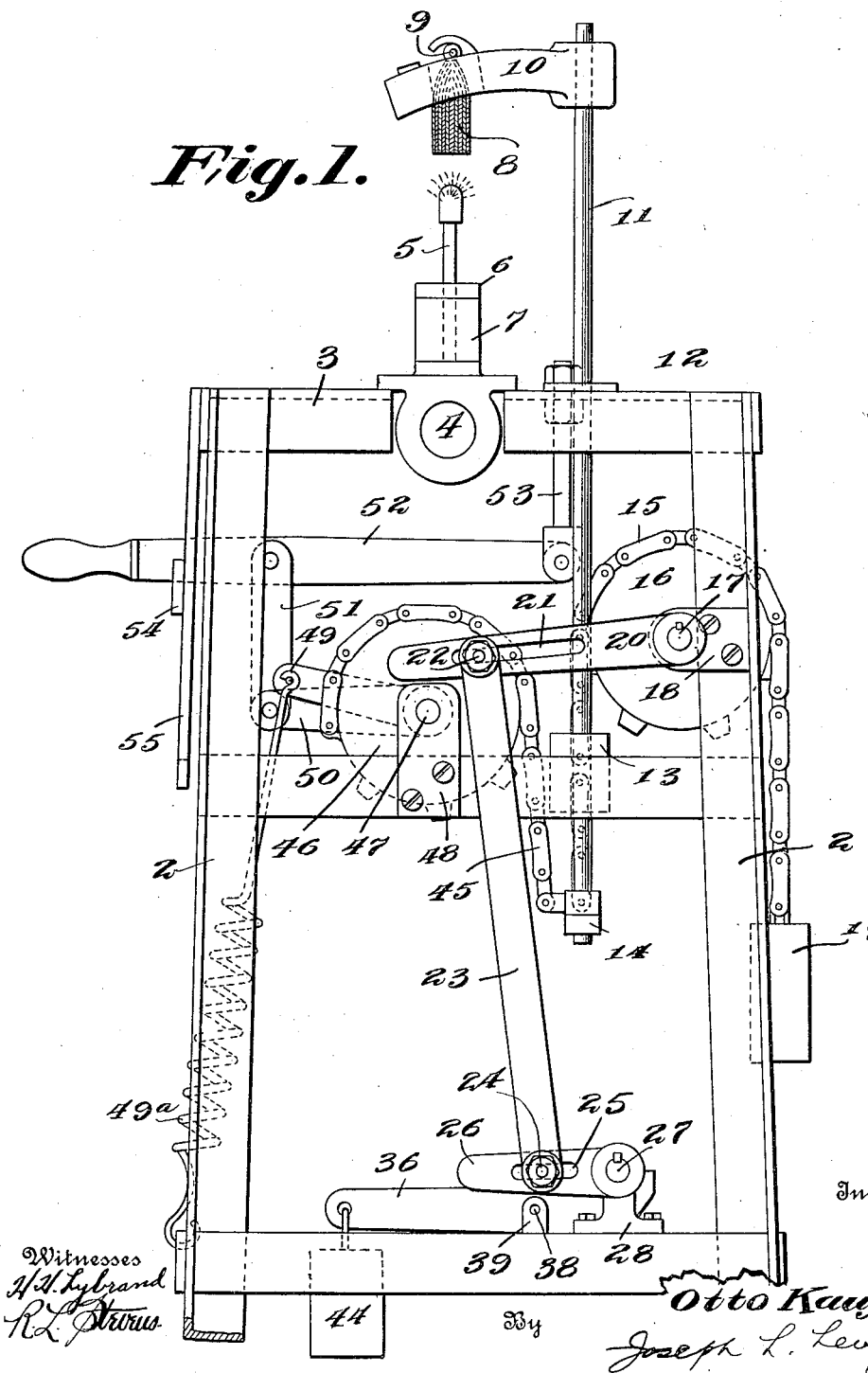
Figure 8:
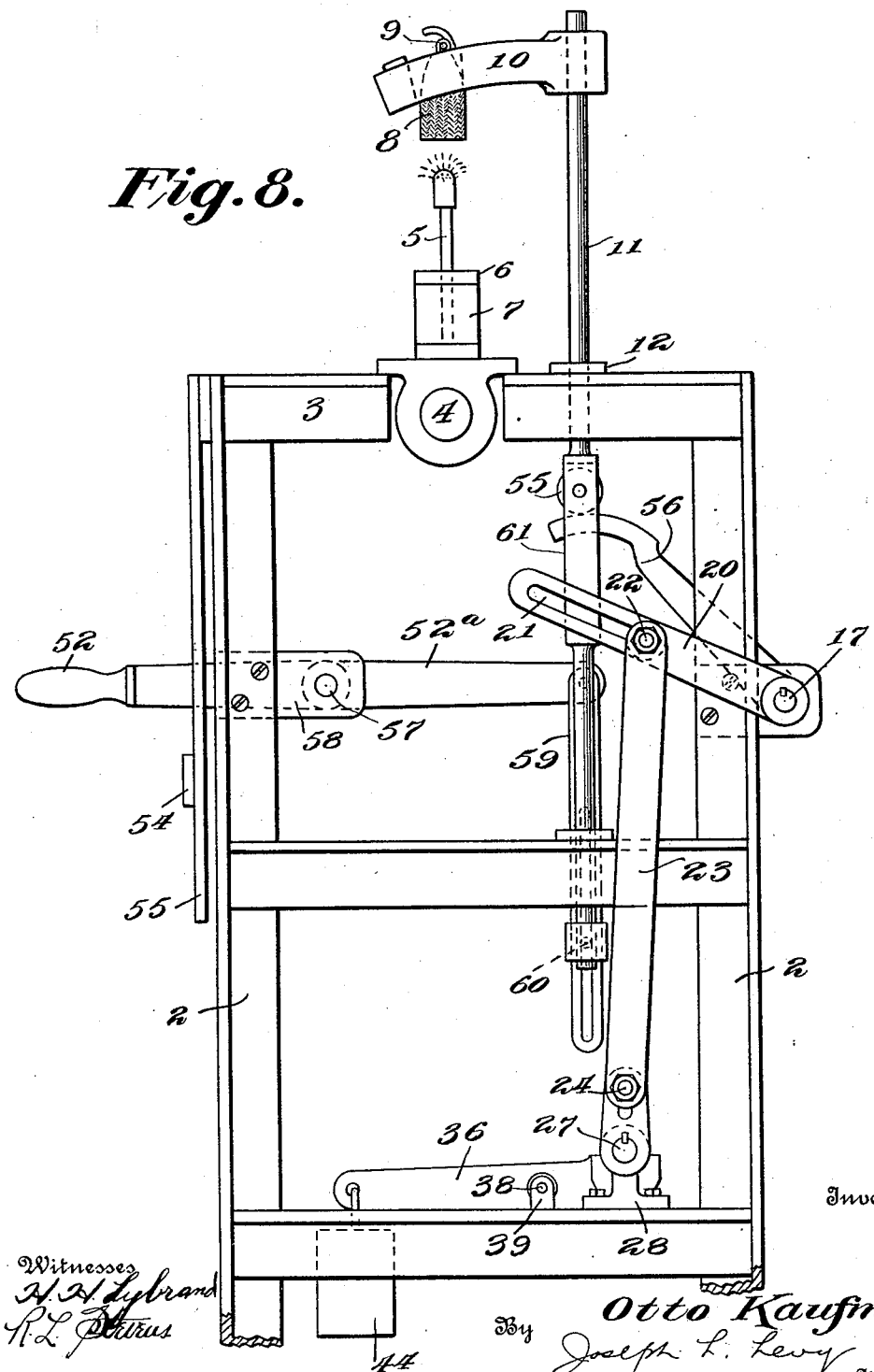

Figure 1 is an end view of a machine embodying my invention. Fig. 2 is a front view of the same. Fig. 3 is a detailed view showing a portion of the actuating mechanism. Figs. 4, 5, 6 and 7 show further details. Fig. 8 is an end view of a modified machine and Fig. 9 is a front elevation of the same.

Throughout the various views of the drawings, similar reference characters designate similar parts.

My improved machine 1 is provided with suitable legs or supports 2, at the top of which is a table 3 carrying a suitable gas pipe 4, from which extend Bunsen burners 5. As many of these burners may be used as desired, although only four are shown in Figs. 2 and 9. The burners 5 are held in proper alinement by means of a perforated crossing 6 secured to pedestals 7, which project upwardly from the table 3.

The mantles 8, which are to be treated in the machine are hung from a suitable rod 9 mounted on projections 10 that run from suitable rods or slides 11, which have a vertical movement through guides 12 and 13, the guides 12 being on the table 3 and the guides 13 being secured to the support 2. The lower ends of the rods 11 are united by a crossing 14, which may be secured in any suitable manner, so that the rods 11 will always move in unison with a true movement in the direction of their axes through the guides 12 and 13. The crossing 14, near each end, is provided with a sprocket chain 15, which runs over a sprocket wheel 16, mounted on a shaft 17 journaled in bearings 18 on the supports 2. The farther end of each chain 15 is provided with a counter-balance weight 19, which hangs therefrom, as shown. One end of the shaft 17 has a crank 20 fixed thereto by means of a key and slot connection, or otherwise, and this crank is slotted at 21 to receive a pin 22, that is pivotally connected to a link 23 that engages a second pin 24 mounted in a slot 25 in a crank 26 fixed by a key and slot connection, or otherwise, to a screw shaft 27, mounted in suitable bearings 28, on the frame 2 of the machine. The other end of the shaft 27 has a collar 29 against which rests a coiled spring 30 which also presses against a sprocket wheel 31, which is adapted to be driven continuously by means of a sprocket chain, not shown. The sprocket wheel 31 has a projecting pin 32 adapted to engage a similar pin 33, which extends from a collar 34 fixed on the shaft 27, when the sprocket wheel is shoved toward this collar 34 by means of the tension of the coil spring 30. However, as the machine does not run continuously, means must be provided for keeping the pins 32 and 33 out of engagement when the machine is not in operation. This is done in the following manner: A short bar 35 is mounted to slide freely in the direction of its length through a bearing 28, as shown in Fig. 6. This bar is forced against the sprocket wheel 31 by an arm or lever 36, which has a surface or half nut with screw threads adapted to engage corresponding threads 37 on the shaft 27. This bar 36 has its threads only through 180°, so that it may be moved from the threads 37 by raising its free end, as said lever 36 is fulcrumed and slidably mounted on a rod 38, which is carried by suitable supports 39, which extend from the frame 2 of the machine. The bearing or rod 38 is also provided with a suitable collar 40, slidably mounted thereon, and provided with a set screw 41, so that it may be fixed at any desired position. The bar 36 is provided with a projecting pin 42 adapted to receive one end of a coiled spring 43, the other end of which is secured to the frame of the machine, so that by raising the free end of the bar 36, this spring 43 may be made operative to draw this bar 36 against the stop 40. The weight 44 at the free end of the bar 36 causes the threads of the bar to rest against the threads 37 of the shaft 27. The collar 40 is placed on the bar 38 with regard to the time which the mantles are to be subjected to heat and this time is absolutely controlled by the position of this collar taken in connection with the speed of rotation of the shaft 27.

Whenever the rod or lever 36 is away from the pin 35, the coiled spring 30 acts so as to cause the sprocket wheel 31 to drive the machine. When the bar 36 forces the rod 35 against the sprocket wheel 31, this sprocket wheel is moved against the tension of the spring 30 so that the pins 33 and 32 are out of contact and then the rotation of the sprocket wheel 31 in no way actuates the mechanism of the machine. The bar 14 also is provided with a second set of sprocket chains 45, which run over suitable sprocket wheels 46 fixed to a shaft 47, journaled in suitable bearings 48 secured to the frame 2 of the machine. The sprocket chains 45 at their other ends are secured to these sprocket wheels, so that when the wheels are rotated, these chains are drawn over the wheel. As these wheels are fixed to the shaft 47, they are rotated when the shaft is rotated and the shaft 47 is rotated by means of a crank 49 fastened to a spring 49ª which also runs to the frame 2 of the machine and also by a second crank 50 connected to a link 51 that runs to a handle 52 to which it is connected, as shown, and the rear end of this handle 52 is pivotally mounted to a bar 53, depending from the table 3 of the machine. Near the front, this handle 52 presses against the catch plate 54, adjustably mounted on a guide 55 fixed to the frame of the machine and this handle 52 may be depressed, so as to be held by this plate 54 and thereby raise the mantles to such an extent that the flames will play against their lower edges and thereby properly cure the same and shape them.

In Figs. 8 and 9, the structure is much the same as above described, except that the rods 11 instead of being raised and lowered by means of sprocket chains and wheels, and similar connections, have suitable cam rollers 55, which are engaged by corresponding cams 56, extending from the shaft 17. The handle 52 runs to a shaft 57 mounted in suitable brackets 58 secured to the frame 2 of the machine. Cranks 52ª fixed to this shaft 57 engage suitable links 59, which have a slotted connection with the slides 11, so that these slides may move quite a distance without interfering with the links 59. However, when the lever 52 is drawn far enough, the pin 60 at the lower end of each of the bars 11 engages the corresponding end of the slot in each link 59 and then the shafts 11 are raised, so that the flames can play against the lower edges of the mantles 8. It is to be noted that the rollers 55 are placed in suitable slots 61 in the shafts 11, so that the cams 56 have suitable guides at their free ends.

In view of the foregoing, the operation of my improved machine will be readily understood. Assuming the parts to be as shown in either Fig. 1 or 8, the lever 36 has its weight 44 raised and then the spring 43 draws this lever against the stop 40, when the weight 44 is released and allowed to bring the lever 36 against the screw threads 37. As above described, the sprocket wheel 31 drives the shaft 27 and continues to drive it for many revolutions depending upon the length of travel of the lever 36 and this travel is limited by the bar 35 which forces the sprocket wheel 31 against the tension of the spring 30, so that the pins 32 and 33 cease to engage. While the shaft 27 is rotating, the crank 26 rotates and thereby oscillates the crank 20, the amount of oscillation depending entirely upon the positions of the bolts 22 and 24 in their respective slots. The oscillating movement of the crank 20 is changed into a reciprocating movement of the bars 11, which raise and lower the mantles over the flames from the burners 5. When the mantles have been sufficiently shaped by the action of the flames and the machine has come to rest, the operator then depresses the handle 52 and places the same under the catch 54, so that the lower ends of the mantles are properly treated by the flames. The mantles are then removed by removing the bar 9, from which they are suspended. A new bar with more mantles is substituted, the lever 52 is disengaged and the weight 44 and lever 36 are placed as before described and this operation is repeated indefinitely, as long as the machine remains in use.

While I have shown and described some embodiments of my invention, it is obvious that it is not restricted thereto, but is broad enough to cover all structures that come within the scope of the annexed claims.

Having thus described my invention, what I claim is:

1. In a machine of the class described, a plurality of burners, means for supporting a plurality of mantles over said burners, automatic means for shifting said mantles over said burners a multiple number of times, manual means for raising said mantles so that the lower extremities of the same may be properly treated by the flame and means for varying the amount of oscillation of the operating means.

2. In a machine of the class described, a plurality of burners, a frame for supporting the same, slides and means connected to said slides for supporting mantles above said burners, means for giving automatically a multiple number of reciprocations to said slides so that the mantles will be properly treated by the flames, manual means for raising said slides so that the flames can play on the bottoms of the mantles and means for varying the amount of oscillation of the actuating means.

3. In a machine of the class described, a plurality of burners, a frame for supporting the same, slides and means connected to said slides for supporting mantles above said burners, means for giving automatically a multiple number of reciprocations to said slides so that the mantles will be properly treated by the flames, manual means for raising said slides so that the flames can play on the bottoms of the mantles, means for varying the amount of oscillation of the actuating means and automatic means for disconnecting the driving means after a predetermined number of reciprocations.

4. In a machine of the class described, a frame and a plurality of burners supported thereby, slides and means for guiding the same in said frame, means on said slides for supporting a plurality of mantles above said burners, a shaft mounted to be oscillated and means for connecting the same to said guides, so that the said guides will reciprocate in unison with the oscillations of said shaft, a crank fixed upon said shaft, a link connected to said crank, a second shaft and a crank fixed to said second shaft and connected to said link, screw threads on said shaft and a lever with a half nut connected to said shaft and means for driving said shaft and means for causing said lever to disconnect said driving means from said shaft.

5. In a machine of the class described, a frame, a plurality of burners supported thereby, means for supporting a plurality of mantles, means for oscillating said supporting means, embodying a shaft, a crank fixed on said shaft, a second shaft, a crank fixed thereon and connected with the first-named crank, a lever connected with said second shaft, means for driving said shaft and means for causing said lever to disconnect said driving means from said shaft.

Signed at the city of Youngstown, county of Mahoning, State of Ohio, this 10th day of April, 1912.

OTTO KAUFMAN.

Witnesses:
  Jos. Phillips,
  Charles Kirsch.

---

Copies of this patent may be obtained for five cents each, by addressing the "Commissioner of Patents, Washington, D. C."